United States Patent [19]
Swierczek

[11] Patent Number: 5,121,417
[45] Date of Patent: Jun. 9, 1992

[54] COUNT-LOCKED LOOP TIMING GENERATOR

[75] Inventor: Stephen A. Swierczek, Fairport, N.Y.

[73] Assignee: Eastman Kodak Company, Rochester, N.Y.

[21] Appl. No.: 239,872

[22] Filed: Sep. 2, 1988

[51] Int. Cl.⁵ .............................. H03D 3/24
[52] U.S. Cl. ........................ 375/120; 331/18
[58] Field of Search ............ 375/119, 120; 331/1 A, 331/18; 377/43

[56] References Cited

U.S. PATENT DOCUMENTS

| | | | |
|---|---|---|---|
| 3,668,315 | 6/1972 | Heitzman | 375/119 |
| 4,242,639 | 12/1980 | Boone | 328/155 |
| 4,280,099 | 7/1981 | Rattlingourd | 375/119 |
| 4,400,817 | 8/1983 | Sumner | 375/119 |
| 4,415,933 | 11/1983 | Murayama et al. | 375/119 |
| 4,535,461 | 8/1985 | Stepp et al. | 375/110 |
| 4,614,973 | 9/1986 | Sorenson | 358/153 |
| 4,623,845 | 11/1986 | Ide | 328/60 |
| 4,628,519 | 12/1986 | Najafi | 375/110 |
| 4,680,780 | 7/1987 | Agoston et al. | 375/120 |
| 4,694,259 | 9/1987 | Carickhoff et al. | 375/120 |
| 4,695,805 | 9/1987 | Massingill et al. | 328/72 |
| 4,712,223 | 12/1987 | Nelson | 377/43 |
| 4,712,225 | 12/1987 | Nelson | 377/43 |

Primary Examiner—Douglas W. Olms
Assistant Examiner—Tesfaldet Bocure
Attorney, Agent, or Firm—Edward Dugas

[57] ABSTRACT

The present invention is an all digital timing and address generator which automatically adjusts its output pulse intervals to fit within the duration of periodic input pulses. The intervals are alway synchronous with the leading edges of the input pulses, and their number within the duration of a periodic input pulse is selectable in increments of one. The generator uses direct digital feedback to control its output timing for changes in input pulse width, and employs an integer time mark to prevent "unlocking" on non-integer width input pulses.

8 Claims, 13 Drawing Sheets

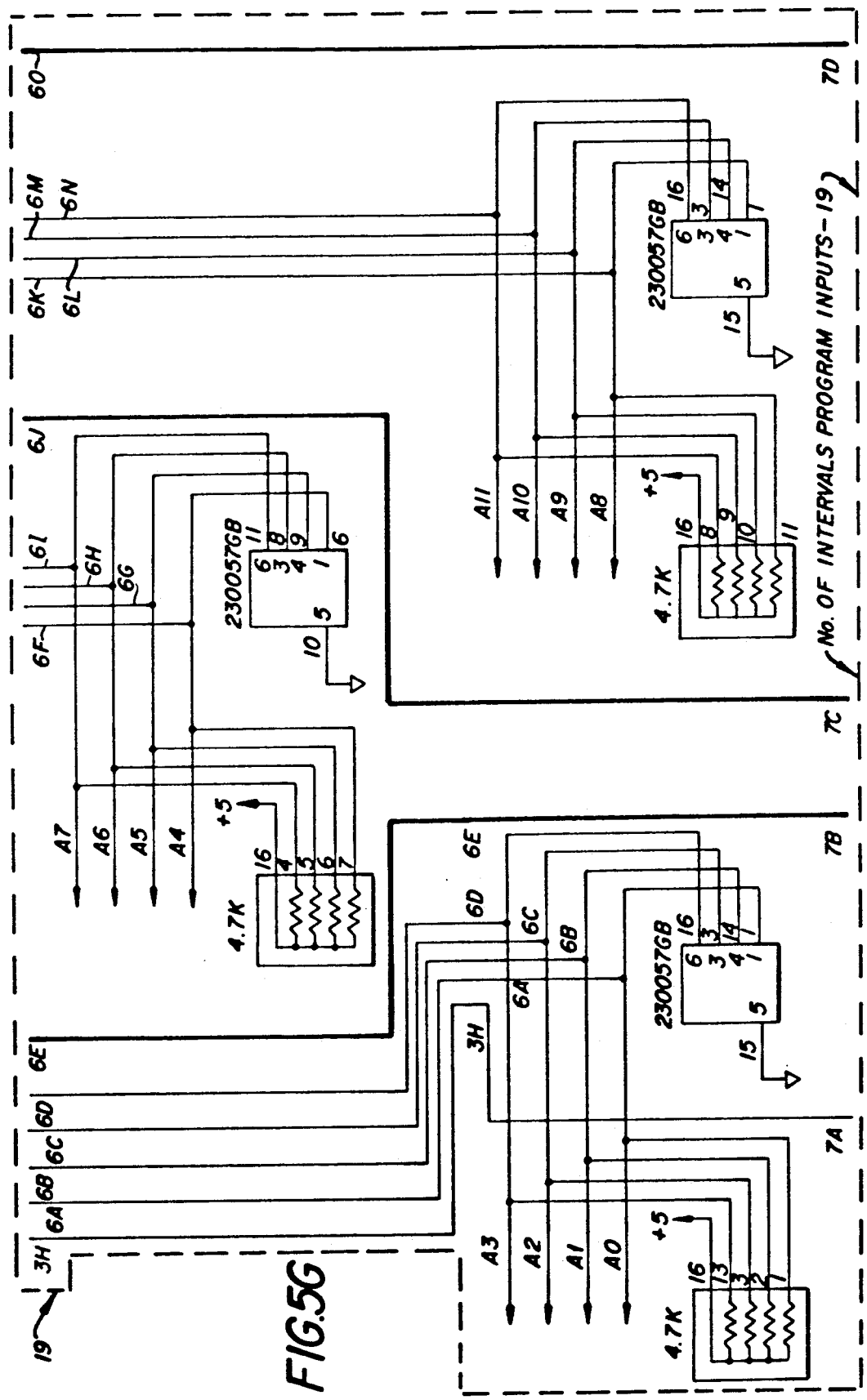

COUNT-LOCKED LOOP TIMING GENERATOR

TECHNICAL FIELD OF THE INVENTION

The invention relates to the field of digital timing generators and, more particularly, to digital timing generators which generate a frequency by automatically adjusting their output pulse streams.

BACKGROUND OF THE INVENTION

Timing generators are used to synchronize the many functions found within electronic systems. Most commonly, a certain number of operations must be performed in a given interval of time, this interval of time, generally a cycle time, is marked by a start and a stop pulse or a cycle pulse whose duration is equal to the time between start and stop pulses. It is the purpose of the timing generator to divide the cycle time into sub-intervals, usually of equal length, so that the number of sub-intervals equals the number of operations to be performed. This process is performed in synchronism with the start/stop or cycle pulses. An example of sub-interval timing is in the division of a spinning motor's shaft rotation into 360 equal intervals, one for each degree of rotation. The fact that the rotational speed of the motor's shaft can change, requires that the timing generator adapt its interval timing rate to the varying shaft speed. In this sense, the timing generator is considered to be adaptive and, as such, must vary the time between sub-intervals to accommodate the change in cycle, or shaft rotation time.

The conventional approach to adaptive timing generation for these types of devices has been the phase locked loop (PLL). The dynamic range of the PLL, that is, its ability to accommodate large changes in cycle time, is relatively constrained by noise and saturation in the feedback loop, and in the limited range of the PLL's phase comparator. In electrophotographic copiers and material scanning systems, this necessitates manual adjustment of controls for document or material width, and often does not permit the most efficient use of image memory.

SUMMARY OF THE INVENTION

In the preferred embodiment of the invention, there is provided and all digital count-locked-loop (CLL) timing generator which automatically adjusts its output pulse intervals to fit within the durations of periodic input pulses. The intervals are synchronous with the leading edges of the input pulses and their number within the pulse interval is selectable in increments of one. The generator uses a direct digital feedback loop to correct its output timing for changes in input pulse width and in one embodiment employs an integer time marker to prevent unlocking on non-integer width input pulses.

In one embodiment, a clock oscillator is gated by the periodic input pulses through synchronizing logic circuitry and is used to drive a divide-by-N counter (first counter). The divide-by-N counter has first and second inputs, with the first input receiving the gated clock pulse signals from the clock oscillator and the second input receiving a number count N provided by an N counter (second counter). The output N from the N counter is incremented, left as is, or decremented at the end of the input pulse by the output from a magnitude comparator. The magnitude comparator compares the selected input interval value against the output interval value from the divide-by-N counter in accordance with the difference and/or error between the fixed input value and the provided output value. The digital feedback loop is comprised of an output clock divided-by-N counter (third counter), the magnitude comparator and a program input reference number device for providing the reference interval count number. The digital feedback loop conditions the N counter at a rate of one count per input pulse, to provide the divide-by-N counter with the appropriate value of N so that the number of clock pulses divided by N outputted during each input pulse, matches the number of desired output intervals entered into the program input to establish the reference interval count number.

In a second embodiment of the invention, a divide by the reference number counter (fourth counter) provides an output that is directed to an enabling input to the synchronizing logic circuitry. The reference number counter receives as an input the gated oscillator signal from the synchronizing logic circuitry and is connected to receive the reference number from the program input. In this embodiment, the fourth counter is synchronized in time with the divide-by-N counter and inhibits any change of the value in the N counter if the input pulses width changes and terminates at a time which is not longer by at least one integer value of the selected interval. Thus, the N counter is allowed to increment or decrement only at times corresponding to integer values for the clock divided by N signal interval thus maintaining the loop in lock even in the presence of jittery input pulses.

From the foregoing, it can be seen that it is a primary object of the present invention to provide an all digital timing generator which automatically adjusts its output pulse intervals to fit within the durations of periodic input pulses.

It is also another object of the present invention to provide output pulses which are synchronous with the leading edges of input pulses.

It is a further object of the present invention to provide a digital timing generator having an extended dynamic range which may be easily increased to accommodate differing input pulse widths.

It is a further object of the present invention to provide a digital timing generator which does not utilize analog phased locked oscillators.

These and other objects of the present invention will become more apparent when taken in conjunction with the following description and drawings wherein like characters indicate like parts and which drawings form a part of the present description.

DESCRIPTION OF THE PREFERRED EMBODIMENTS

For general background, in a typical divide-by-N counter, N is an integer value from which the counter is decremented to zero during each division cycle. At zero count, a terminal count pulse is generated which resets the counter to the value N, and the cycle repeats. Of course, if N is zero, every decrement will provide a terminal count pulse, hence, N defaults to one under this circumstance. If the counter is decremented at the rate of $F_{clock}$ hertz, the resulting terminal count pulse frequency, $F_t$, will correspond to:

$$F_t = F_{clock}/N \tag{1}$$

where:
$F_t$ = the terminal count pulse repetition frequency
$F_{clock}$ = the frequency at which the counter is decremented
N = an integer value greater than zero with the time interval between terminal count pulses t, being the reciprocal of $F_t$.

$$t = 1/F_t \tag{2}$$

Substituting Equation (1) for $F_t$, $$t = 1/F_{clock}/N = N/F_{clock} \tag{3}$$

Assuming that the division cycle is repeated B times, exactly B terminal count pulses would be generated over a time duration $t_p$, $$t_p = Bt \tag{4}$$

Substituting Equation (3) for t.

$$t_p = BN/F_{clock} \tag{5}$$

and thus, $t_p$ can be changed by altering the value of N.

Since $F_{clock}$ is usually a fixed frequency developed by a crystal oscillator, for example, and B and N are integer values, it can be shown that Equation (5) is satisfied only for discrete values of $t_p$. Since, however, in this equation, there are no upper limits placed on B, N or $F_{clock}$, $t_p$ can be resolved into very fine increments over an unlimited range of values. By rearranging Equation (5) and solving for B, the number of division cycles for a given pulse width is represented by, $$B = t_p F_{clock}/N \tag{6}$$

Figure 1:
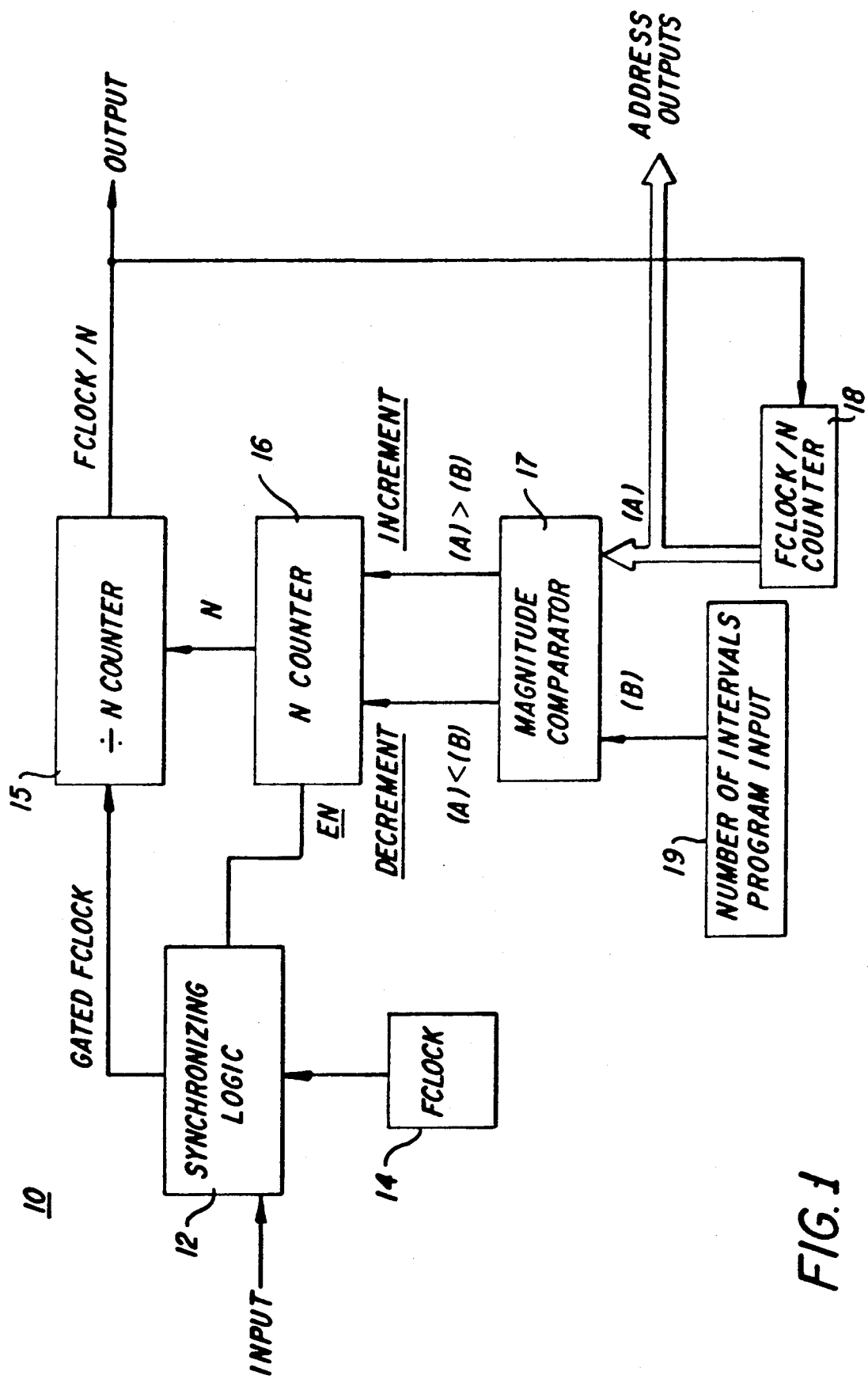
FIG. 1 is a block diagram of one embodiment of the present invention.

The digital count-locked-loop (CLL) timing generator 10 shown in FIG. 1 exploits this ability. Its operation is based upon a divide-by-N counter 15, connected to a digital feedback loop that is formed by an N counter 16, a magnitude comparator 17, an $F_{clock}/N$ counter 18 and a program input reference number device 19. An oscillator 14 provides the clock signal $F_{clock}$ to a synchronizing logic circuit 12. The synchronizing logic circuit 12 provides an enable signal to the N counter 16 and a gated F clock signal to the countdown input to the divide-by-N counter 15 in response to input pulses.

Referencing back to Equation (6), the pulse, $t_p$, can be divided into B intervals by varying the value of N. This is accomplished automatically in the timing generator 10 most notably, without the need for high stability time or frequency sources. The input pulses to be dissected, of width $t_p$, are applied to the synchronizing logic 12, where each pulse gates the passage of $F_{clock}$ into a first counter, the divide-by-N counter 15. N is determined by the value in a second counter, N counter 16, which acts as a filter and storage register in the feedback loop and can be set to some specific value, if desired, when power is applied. The output of the divide-by-N counter 15, for the duration of each pulse $t_p$, consists of terminal count pulses occurring from Equation (1) with a frequency of:

$$F_t = F_{clock}/N \tag{7}$$

where:
$F_t$ = the terminal count frequency
$F_{clock}$ = the frequency at which the counter is decremented
N = the value of the N counter At this point, the digital feedback loop comes into play. These terminal count pulses are accumulated in a thrid counter, the $F_{clock}/N$ counter 18, which feeds the accumulated terminal count value (A) to the magnitude comparator 17. In the comparator, the number of terminal count pulses (A) accumulated during $t_p$ in the $F_{clock}/N$ counter 18, is compared with the value (B). (B) is the number of terminal count pulses one wishes to provide during the interval $t_p$, and the magnitude comparator indicates at any instant whether (A) is greater or less than (B). (A) can thus be regarded as an error signal that is compared with (B), a selectable reference number. At the termination of each input pulse, the synchronizing logic 12 inhibits the gated $F_{clock}$ pulses from decrementing the divide-by-N counter 15 any further. Also, at this same time, the magnitude comparator 17 indicates the value of (A) relative to (B) and if, for example, too few terminal count pulses were produced, that is, (A)<(B), the N counter 16 is decremented and immediately provides this new, lower value of N to the divide-by-N counter 15.

The next iteration of $t_p$ provides the same sequence of events until (A)=(B), and the N counter 16 contains the appropriate value of N to satisfy Equation (6) for B, the number of terminal count cycles required during one input pulse.

In this way, the divide-by-N counter 15 is automatically conditioned by way of the feedback loop consisting of the $F_{clock}/N$ counter 18, magnitude comparator 17, and N counter 16, to adapt its terminal count timing to the input pulse duration.

DYNAMIC RANGE

The dynamic range of the CLL timing generator 10 can be defined as the ratio of the maximum to the minimum input pulse duration to which the loop can adapt. Simply stated:

$$R = t_{pmax}/t_{pmin} \tag{8}$$

where: R = the dynamic range of the CLL timing generator.

By substitution of Equation (5) for $t_p$, it can be shown that;

$$R = N_{max}/N_{min} \tag{9}$$

where N represents the value in the N counter 16.

For a binary counter, the minimum count is zero, which defaults to one in the divide-by-N configuration. The maximum count, $$N_{max} = 2^{x-1} + 2^{x-2} + \ldots + 2^1 + 2^0 \quad (10)$$

or more simply stated, $$N_{max} = 2^x - 1 \quad (11)$$

where x = the number of counter stages, in bits.
From Equation (9), $$R = N_{max}/N_{min} = (2^x - 1)/1 = 2^x - 1 \quad (12)$$

As such, the dynamic range of the CLL timing generator 10 is, theoretically speaking, unlimited, and increases exponentially with the number of counter stages employed.

TRANSIENT RESPONSE

The amount of time required for the N counter 16 to be incremented or decremented to the appropriate value of N, due to a change in input pulse duration, is a measure of the generator's transient response. If the value in the N counter 16 is modified at the rate of one count per input pulse, the time depends upon the pulse rate and duration, and the difference in input pulse width. This can be expressed as:

$$t_d = (t_{rep})(t_{pmax}/t_{pmin}) \quad (13)$$

or $$t_d = (t_{rep})(\Delta N) \quad (14)$$

where:
$t_d$ = the time required for the loop to lock, in seconds
$t_{rep}$ = 1/the pulse repetition rate (in Hertz)
$t_{pmax}$ = the longer input pulse duration
$t_{pmin}$ = the shorter input pulse duration
$\Delta N$ = the change in the value of the N counter 16

Of course, since the dynamic range of the feedback loop determines the maximum difference in input pulse width over which the loop can lock, the maximum time required for the loop to lock on an instantaneous change in input pulse width spanning the full loop dynamic range would be from Equation (13)

$$t_{dmax} = (t_{rep})(t_{pmax}/t_{pmin}) \quad (15)$$

Since:

$$t_{pmax}/t_{pmin} = N_{max}/N_{min} \quad (16)$$

and;

$$t_{max}/t_{min} = R \quad (17)$$

then;

$$t_{dmax} = (t_{rep})R \quad (18)$$

where:
R = the dynamic range of the feedback loop from Equation (9)
$t_{rep}$ = 1/the pulse repetition rate (in Hertz)

Timing Error

Reviewing Equation (6) for B, the number of divide-by-N cycles required to dissect a pulse, $t_p$, into equal intervals, $$B = t_p F_{clock}/N \quad (19)$$

it can be shown that, for a fixed $F_{clock}$, B will attain integer values only for specific values of $t_p$.

Under these circumstances, the CLL timing generator 10 will attain an appropriate value for N, and the terminal (sub-interval) count pulses will all fall within + or $-1/F_{clock}$ period of their respective times, relative to the leading edge of $t_p$.

A situation arises when the values for $t_p$ and $F_{clock}$ result in a fractional value for B. In this case, the loop will alternately switch between two values for N, one too low, and the other too high to satisfy the equation, and the number of sub-intervals generated during $t_p$ will, for one cycle, be too few, and for the next, too many.

A glance at Equation (6) reveals two solutions. Since N is confined to integer values, either $t_p$ or $F_{clock}$ must be conditioned to settle on one value for N. Conditioning $F_{clock}$ can be accomplished using a conventional PLL, but modifying $t_p$ by quantizing its duration is perhaps, the simplest approach. Restating (6), $$B = t_p F_{clock}/N \quad (20)$$

and rearranging, $$F_{clock}/B = N/t_p \quad (21)$$

Substituting, $$F_{clock} = 1/t_c \quad (22)$$

where: $t_c$ = the period of $F_{clock}$ $$Bt_c = t_p/N \quad (23)$$

where:
B = the number of sub-intervals created during $t_p$
$t_p$ = the input pulse duration
N = the value in the N counter when the loop is locked This sequence demonstrates that if a separate counter is configured to divide the gated $F_{clock}$ by the value of B, the terminal count pulses from this counter will coincide precisely with the discrete time intervals of $t_p$ that satisfy Equation (6) for all values of N.

Figure 2:
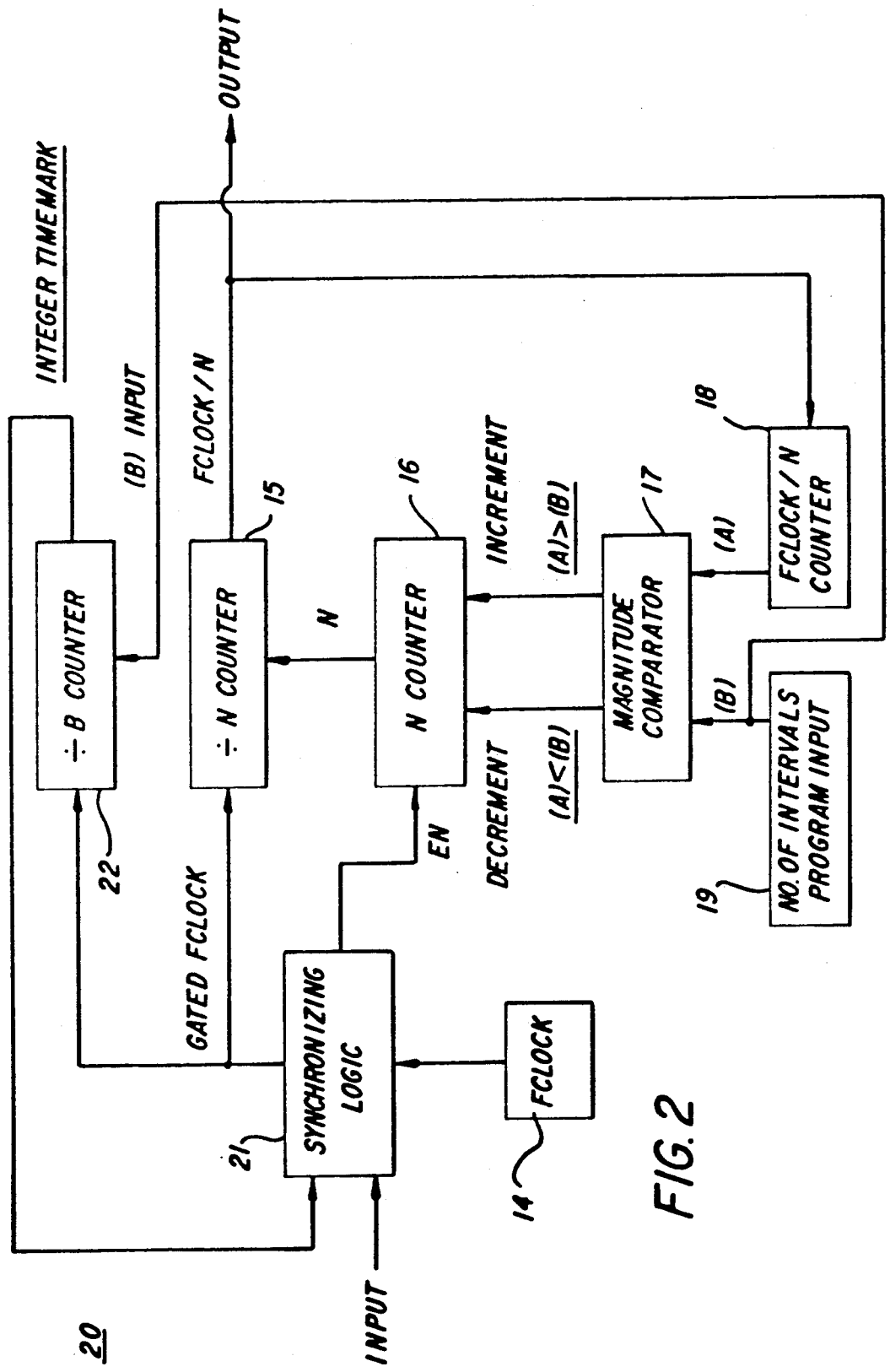
FIG. 2 is a block diagram of another embodiment of the present invention.

FIG. 2 illustrates in block diagram form the implementation of a CLL timing generator 20 with such a counter shown as a fourth counter 22.

The gated $F_{clock}$ signal drives both the divide-by-N counter 15 and the divide-by-B counter 22 to guarantee synchronization of their output pulses. The integer time mark output pulses of the divide-by-B counter 22 are fed to a synchronizing logic circuit 21 where the termination of the input pulse is compared with the occurrence of an integer time mark. The result of the comparison controls the enable line to the N counter 16 to allow a decrement to occur only if the input pulse terminates at least one integer time mark later than the previous input pulse termination.

Under this condition, the maximum time error $\Delta t$ between the actual and the quantized input pulses is, $$\Delta t = t_p - t_q \quad (24)$$

Figure 3:
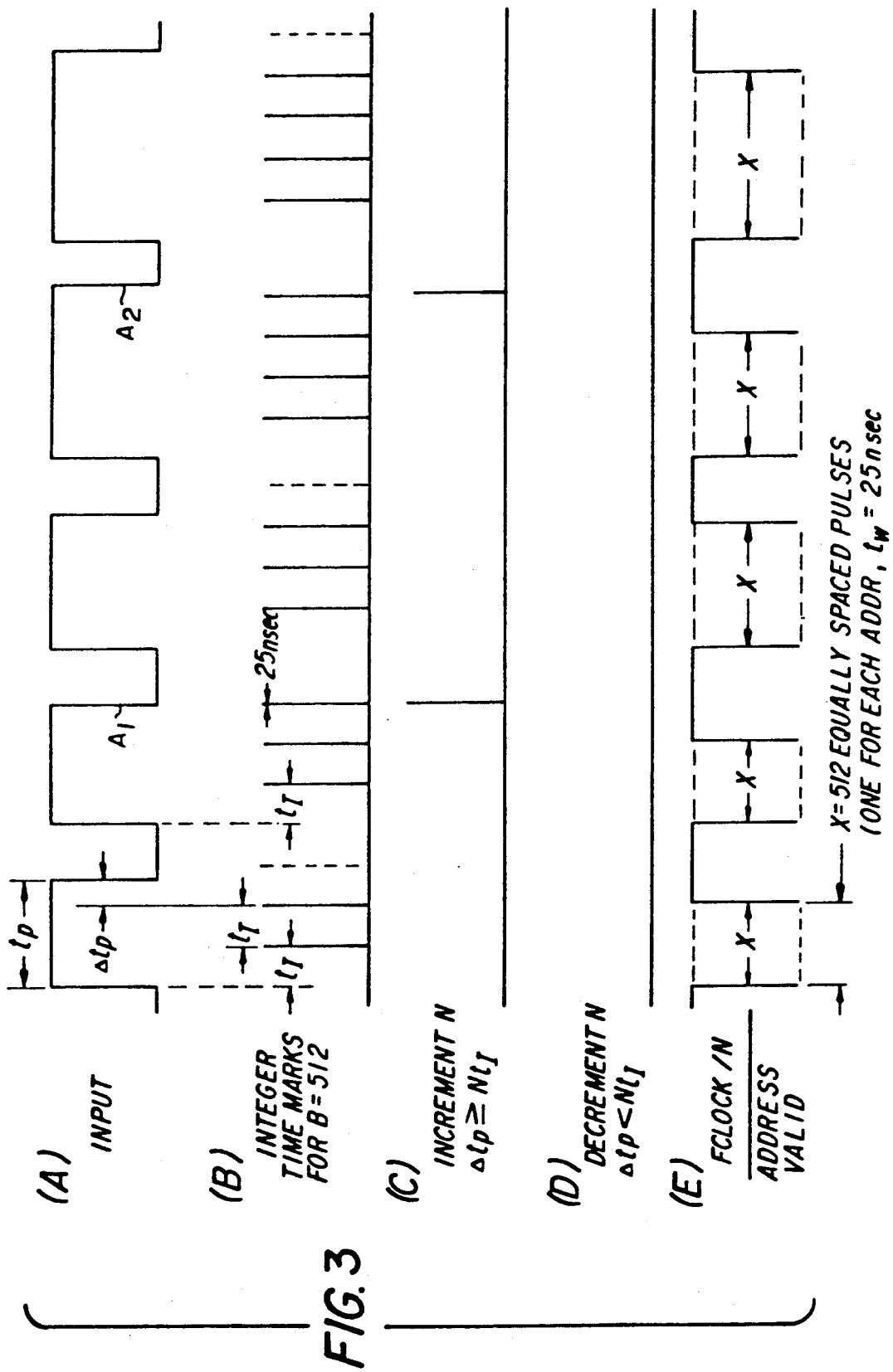
FIGS. 3A-3E illustrate a group of waveforms useful in understanding the operation of the present embodiments when input pulse width is increasing.

From Equation (23), $$t_p = NBt_c \quad (25)$$

and, $$t_q = (N-1)Bt_c \quad (26)$$

where: $t_q$ = the quantized input pulse width
Therefore;

$$\Delta t = NBt_c - (N-1)Bt_c \quad (27)$$

$$\Delta t = NBt_c - NBt_c + Bt_c \quad (28)$$

$$\Delta t = Bt_c \quad (29)$$

where:
B = the number of desired sub-intervals during $t_p$ and
$t_c = 1/F_{clock}$ Referring to FIG. 3, which is a group of waveforms illustrating the CLL's operation when the INPUT signals' pulse width increases, specifically waveform (A) represents a string of INPUT pulses having a nominal pulse width designated $t_p$ which increases in width by an amount $\Delta t_p$.

The waveform of FIG. 4B illustrates the integer time marks for a B value of 512. Each mark is 25 n sec. in width and is spaced at a distance $t_1$. The integer time marks are compared against the termination of the input pulses. A decrement/increment can occur only if the input pulse terminates at least one integer time mark later than the previous input pulse termination. At the termination $A_1$, the integer mark coincides with the input pulse termination and, at termination $A_2$, it is greater. In turn, in FIG. 3C the counter is permitted to increment at these two times.

FIG. 3D shows that decrementing of the counter does not occur during this time period.

FIG. 3E illustrates the CLL timing generator output signal $F_{clock}/N$ where X is equal to 512 equally spaced pulses.

Figure 4:
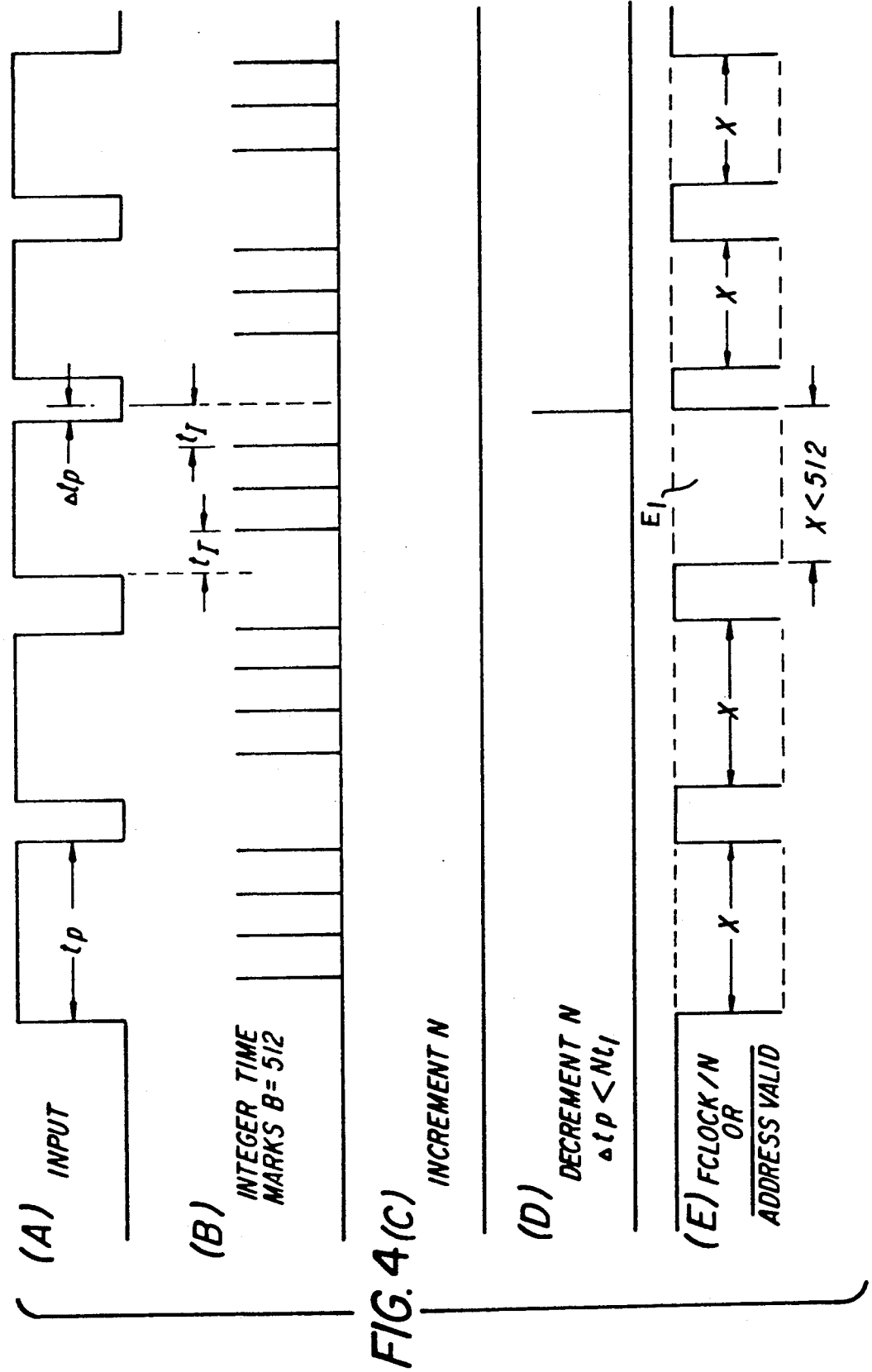
FIGS. 4A-4E illustrate a group of waveforms. useful in understanding the operation of the present embodiments when input pulse width is decreasing.

Referring to FIG. 4, which is a group of waveforms illustrating the CLL's operation when the INPUT signals' pulse width decreases, specifically waveform (A) represents a string of pulses having a nominal pulse width $t_p$ which then decreases in width by an amount $\Delta t_p$.

The waveform of FIG. 4B illustrates the integer timing marks occurring at least one integer time mark later than the previous input pulse termination. FIG. 4C illustrates the increment N waveform which remains flat while FIG. 4D illustrates the decrement N waveform which contains a decrement pulse that is fed to the N counter 16. The resultant output is a group of pulses, illustrated in FIG. 4E which contain 512 equally spaced pulses, except for the transition pulse $E_1$, which contains less than 512 pulses.

FIGS. 5A through 5H illustrate in detail a chip schematic diagram of the CLL timing generator for enabling those persons skilled in the art to replicate the invention without undue experimentation. The illustrated CLL timing generator incorporates three TIL 311 displays coupled to the N counter stages, 74F193's, to display the values stored in the N counter 16. In addition, address outputs FA0 through FA11 are derivable from the (A) output of the $F_{clock}/N$ counter 18. These address signals may be used to address peripheral equipment such as a flying spot laser or a solid state linear array scanner (which form no part of the present invention).

Through circuitry in the sychronizing logic block 21 an ADDRVALID signal is generated to assist in the utilization of the address signals FA0 through FA11.

The number of intervals program inputs block 19 can be set to the value of B from external sources on the input labeled $A_0$ through $A_{11}$ or the value may be established by setting the hexadecimal coded switches 230057GB to reflect the desired value. All of the dotted block circuitry corresponds to like numbered blocks in FIGS. 1 and 2.

Figure 5:
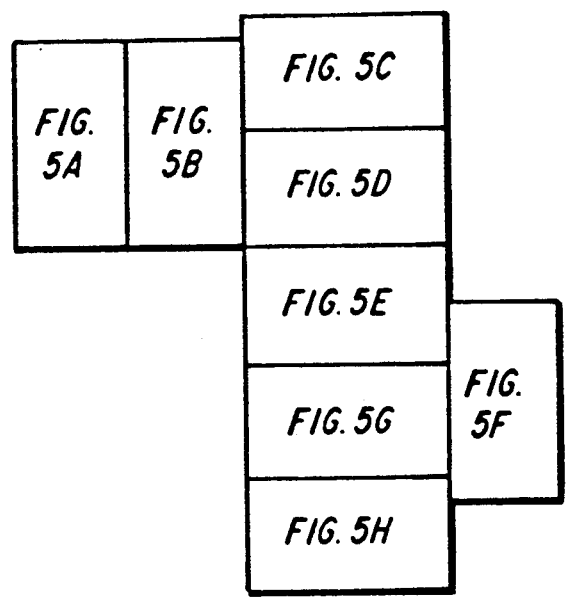
FIGS. 5A through 5H assembled in accordance with the map of FIG. 5 form a detailed chip level schematic diagram of the FIG. 2 embodiment of the present invention.
Figure 5A:
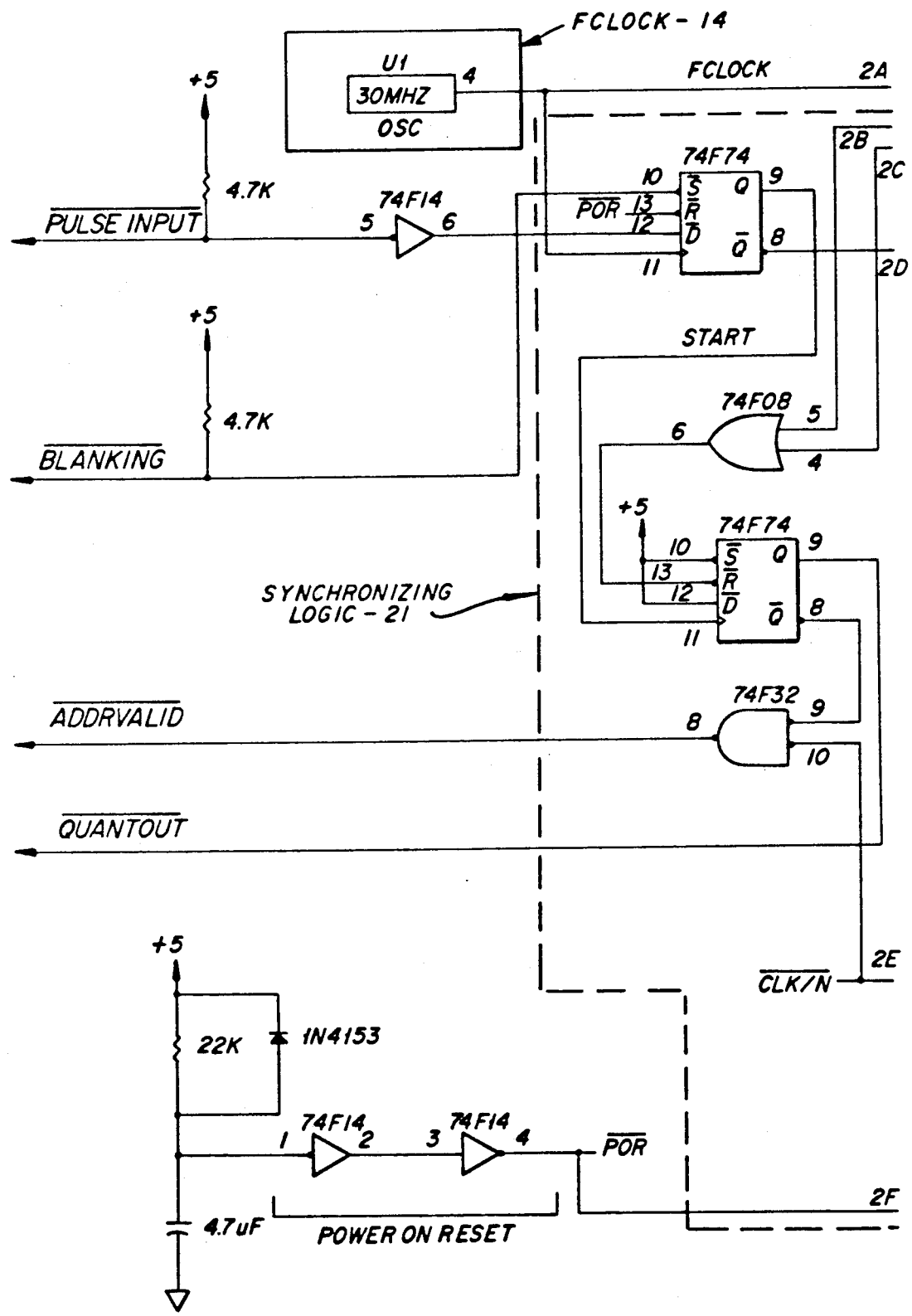
Figure 5B:
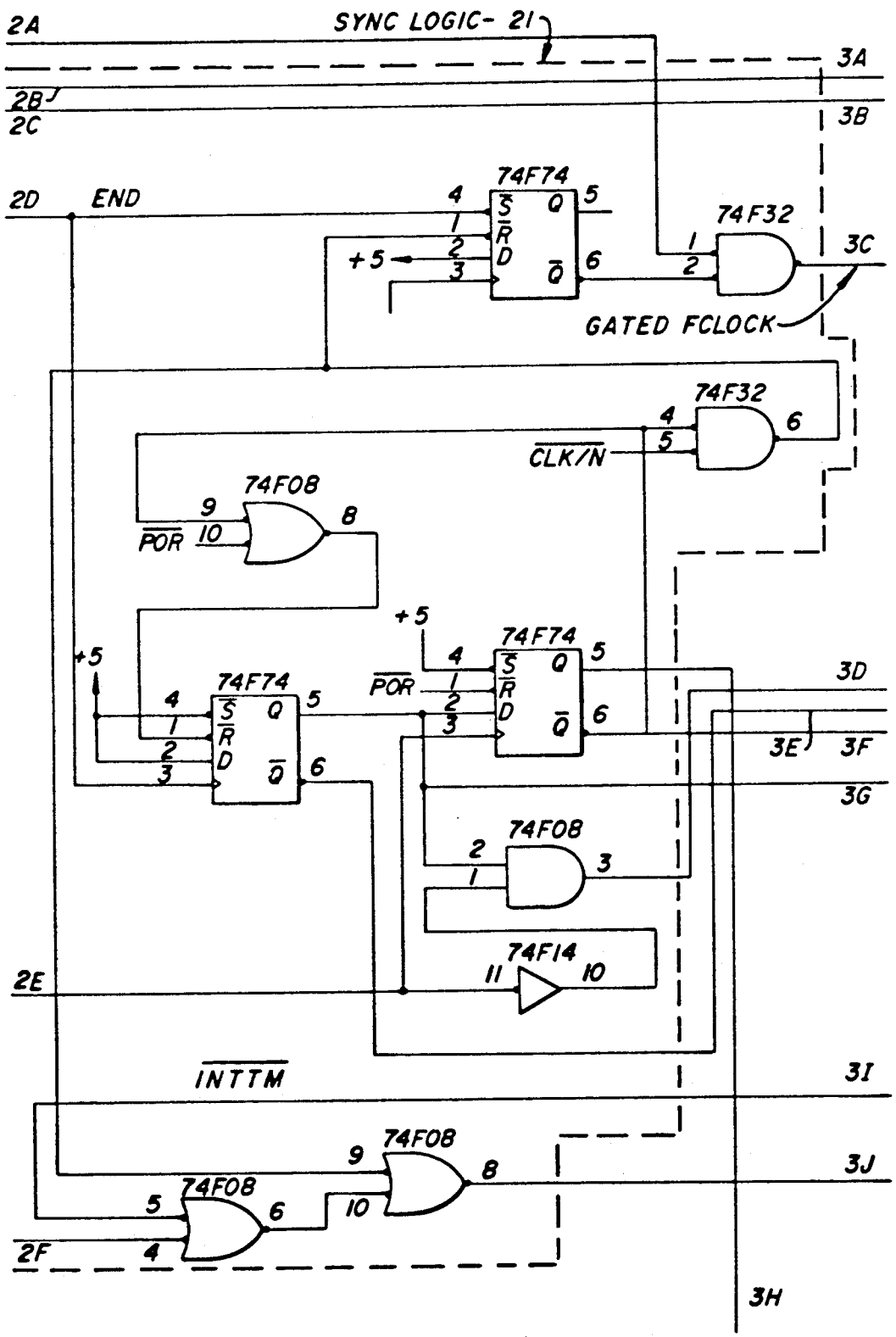
Figure 5C:
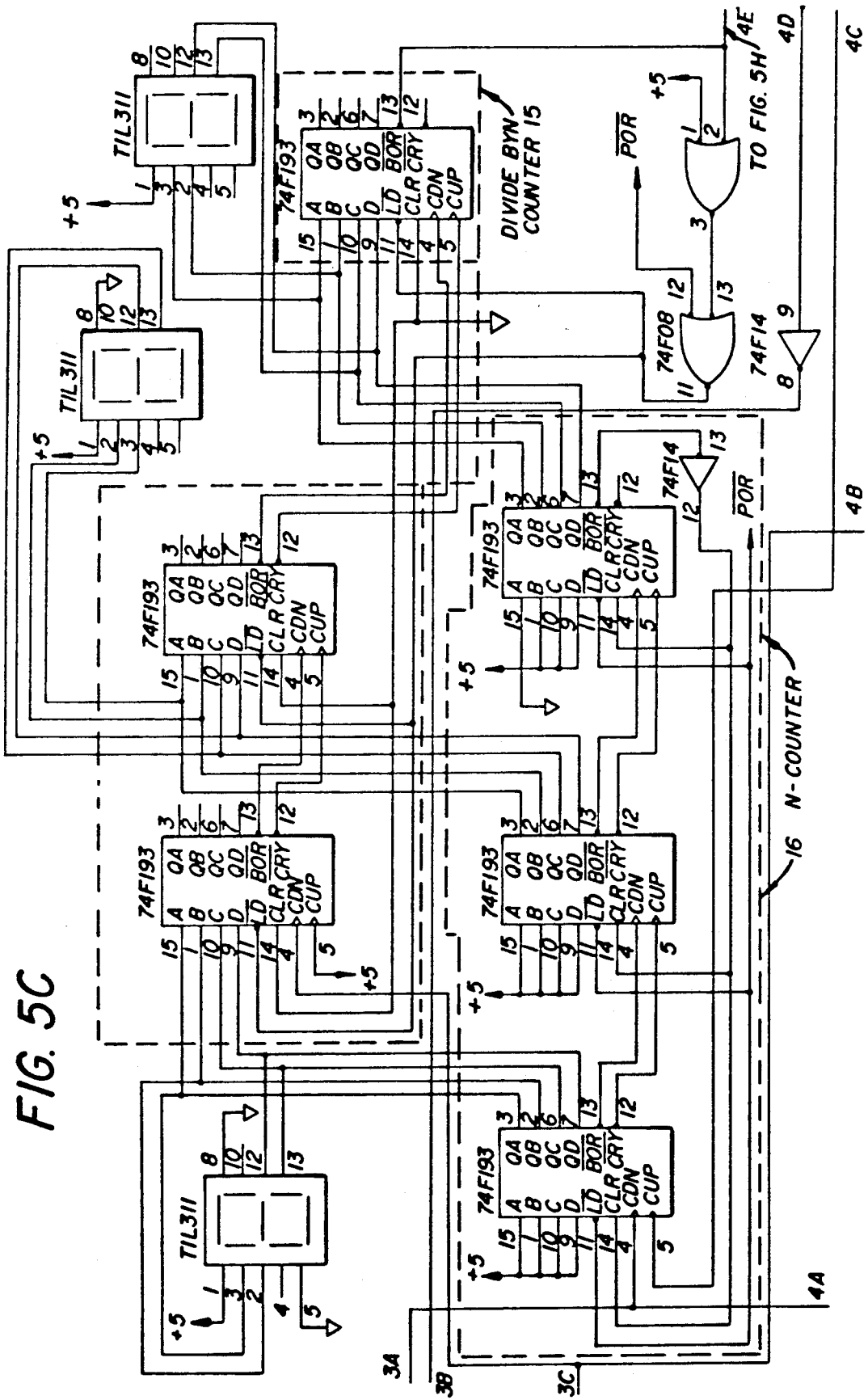
Figure 5D:
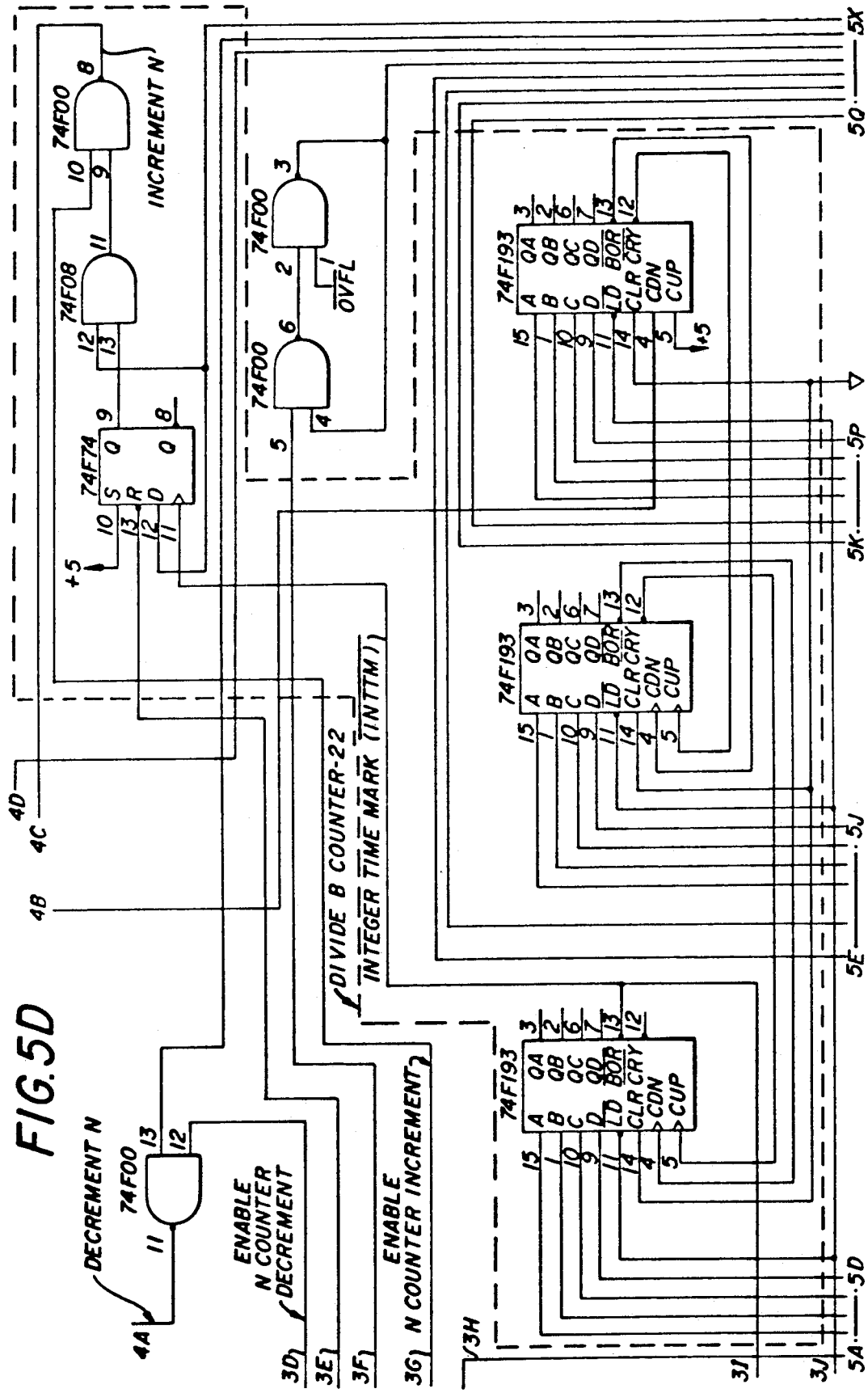
Figure 5E:
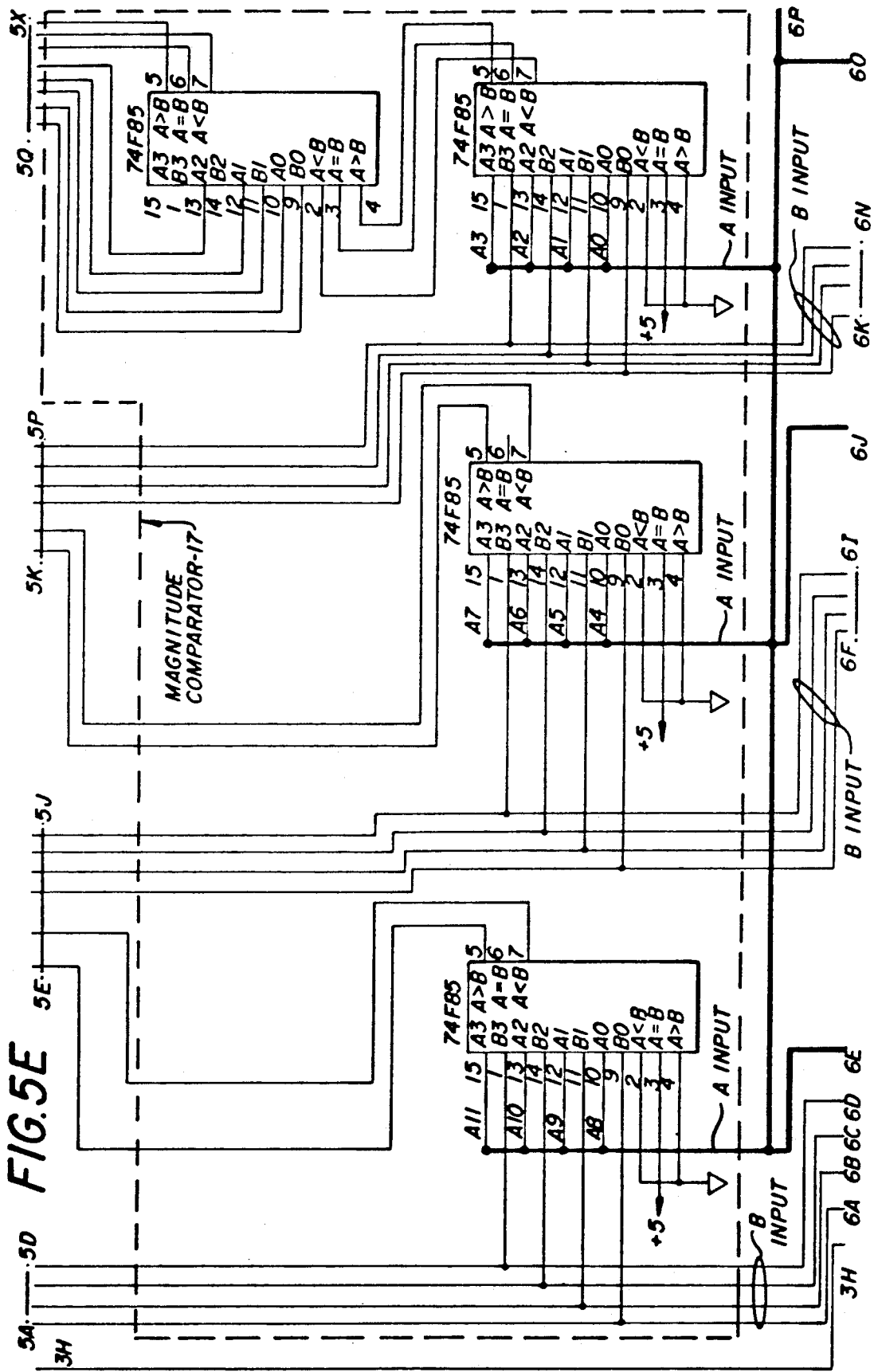
Figure 5F:
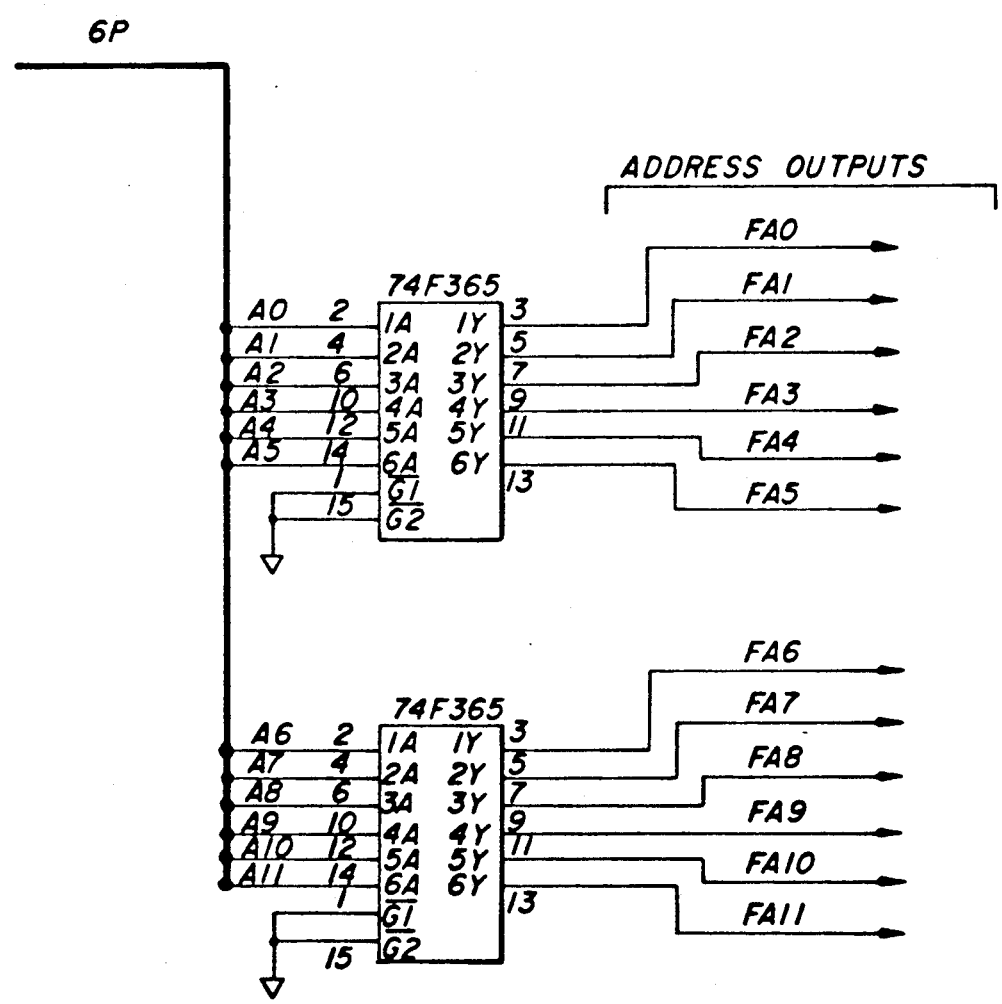
Figure 5H:
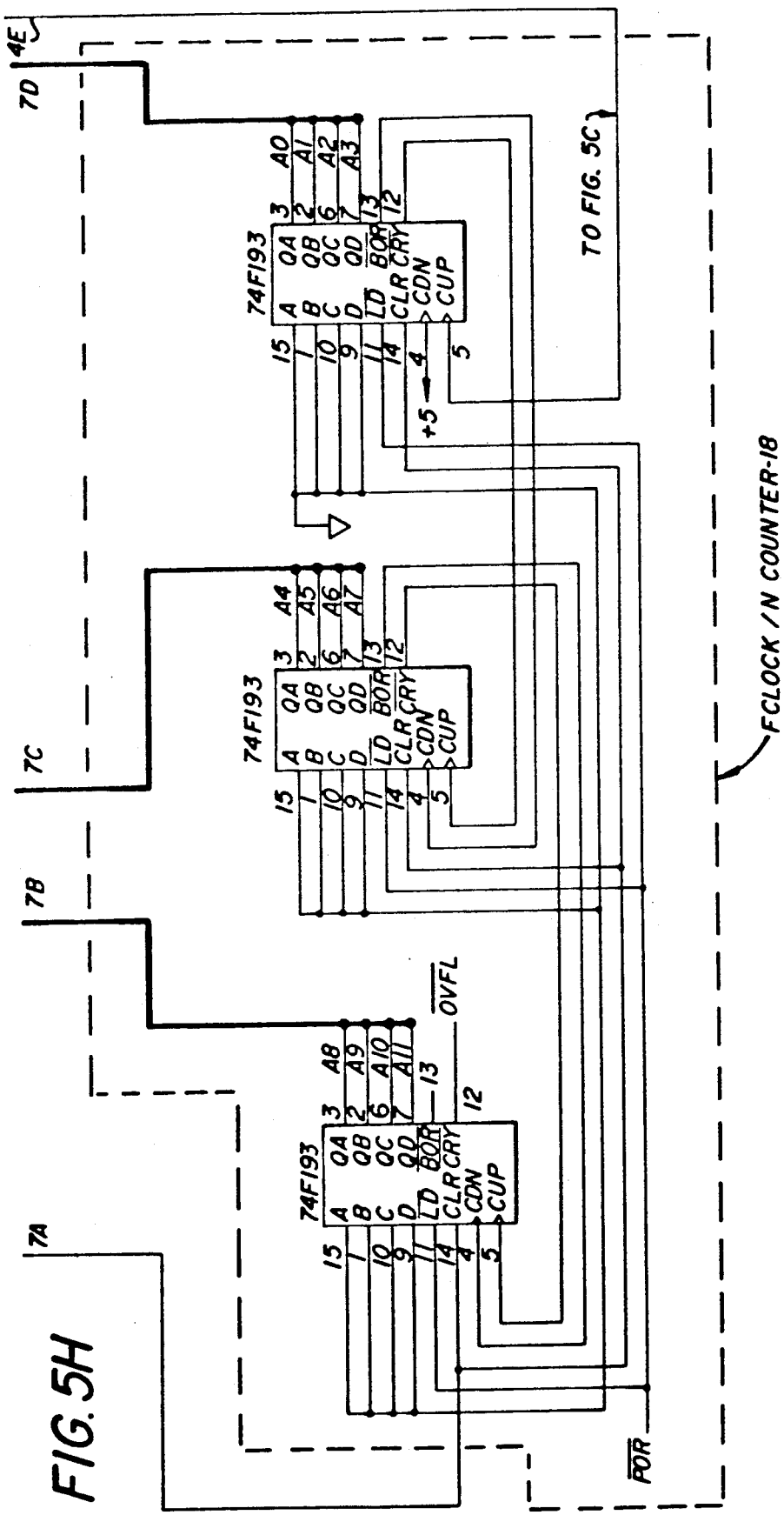

Further description of the interconnections of the chips used in FIGS. 5A through 5B is believed unnecessary as the schematic is self-explanatory to a person skilled in the art.

While there has been shown what are considered to be the preferred embodiments of the present invention, it will be manifest that many changes and modifications may be made therein without departing from the essential spirit of the invention. It is intended, therefore, in the annexed claims to cover all such changes and modifications as may fall within the true scope of the invention.

I claim:

1. A count locked loop for dividing the width of an input pulse into a selectable number of equal intervalled pulses comprising:

oscillator means for providing a train of clock pulses;

synchronizing logic means for gating said train of provided clock pulses to an output as a function of the width of an input pulse;

divide-by-N counter means having first and second inputs, said first input for receiving the gated clock pulses from the output of said synchronizing logic means said second input receiving a signal of value N, said divide-by-N counter dividing the gated clock pulses by the value N to provide at an output a signal corresponding to the selectable number of equally spaced pulses desired within the interval corresponding to the width of an input pulse;

feedback means coupled between the output of said divide-by-N counter means and said second input; and reference means for providing the selectable number signal to said feedback means such that a difference between the value of the output signal from the divide-by-N counter and the value of the selectable number signal determines if number N to be applied to said divide-by-N counter means is changed to minimize the difference.

2. A count locked loop according to claim 1 wherein said feedback means is comprised of:

a comparator means for comparing the magnitude of the output signal from the divide-by-N counter means with the magnitude of the selectable number signal for providing an increment/decrement signal indicative of the difference between the output signal and the selectable number signal; and an N counter means responsive to the provided increment/decrement signal from said comparator means for changing the number N and for providing the number N to said divide-by-N counter.

3. A count locked loop according to claim 2 wherein said feedback means is further comprised of:
a counter means interposed between the output of said divide-by-N counter means and an input to said comparator means for counting the number of pulses contained in the output signal and for providing a count number to said comparator for comparison with said selectable signal.

4. A count locked loop according to claim 2 wherein said synchronizing logic means includes an enable signal means for providing an enable signal to said N counter means for a period corresponding to the width of the input pulses.

5. A count locked loop according to claim 3 and further comprising:
a divide by the selectable number counter having an input for receiving the selectable number signal from said reference means, and the gated signal from said synchronizing logic means for counting down from the selectable number and for being reset by the gated signal, and having an output directed to said synchronizing logic means to control the gating of said synchronizing logic means.

6. A count-locked-loop timing generator comprising:
a clock pulse generating means;
synchronizing logic means for receiving spaced-apart signals corresponding to a timing interval and the clock pulses and for gating said clock pulses to an output during the timing interval and for providing an enable signal;
N counter means having an increment and decrement input for outputting a count signal when the count in said counter corresponds to N after receipt of the enable signal from said synchronizing logic means;
a divide-by-N counter means having a first input connected to the output of said synchronizing logic means for receiving the gated clock pulses and having a second input for receiving the count signal from said N counter means for providing at an output a timing interval signal having a number of equally spaced pulses;
a pulse counter means for counting the number of equally spaced pulses on the output of said divide-by-N counter means;
interval input means for generating a reference count corresponding to the number of equally spaced intervals desired; and
comparator means for receiving the count from said pulse counter means and the reference count from said interval input means for providing an increment signal to said N counter means when the count from said pulse counter means is greater than then the reference count and for providing a decrement signal to said N counter means when the count from said pulse counter means is less than the reference count so to adjust the output of said divide-by-N counter to equally divide the input timing interval into the number of intervals determined by the number of the reference count.

7. A count locked loop for providing a selectable number of equally spaced pulses within a time period established by an input signal comprising:
logic means responsive to the time period of an input signal for providing periodic pulses and an enable signal;
first counter means for receiving the provided periodic pulses and for counting down from a count value at a rate determined by the provided periodic pulses to provide an output signal formed of a number of equally spaced pulses;
second counter means for outputting a count value to said first counter in response to the provided enable signal from said logic means and for changing the count value in accordance with a comparison signal;
third counter means for counting the number of equally spaced pulses in the output signal from said first counter;
programmable means for providing the selectable number corresponding to the number of equal intervals of pulses desired in the output signal from said first logic means; and
comparator means for receiving the number count from said third counter and the provided number from said programmable means for comparing the same and for providing the comparison signal to said second counter means.

8. The count locked loop according to claim 7 and further comprising:
fourth counter means having an input connected to receive the provided periodic pulses from said logic means, an input connected to receive the provided selectable number from said programmable means for providing an output to said logic means to control said enable signal to said second counter in accordance with the value of the selectable number.

* * * * *